United States Patent [19]

Lins et al.

[11] Patent Number: 4,969,720

[45] Date of Patent: Nov. 13, 1990

[54] MAGNETO-OPTIC BYPASS SWITCH

[75] Inventors: Stanley J. Lins, Bloomington; David L. Fleming, Edina, both of Minn.

[73] Assignee: Unisys Corporation, Blue Bell, Pa.

[21] Appl. No.: 402,738

[22] Filed: Sep. 5, 1989

[51] Int. Cl.⁵ .................................................. G02B 5/30
[52] U.S. Cl. ..................................... 350/381; 350/382
[58] Field of Search ..................... 350/370, 374, 96.12, 350/403, 400, 96.13, 381, 382–383; 428/701, 700

[56] References Cited

U.S. PATENT DOCUMENTS 4,478,494 10/1984 Soref .................................... 350/381

OTHER PUBLICATIONS

Shirasaki et al., "Bistable Magneto-optic Switch for Multimode Optical Fiber", Applied Optics, Jun. 1, 1982, vol. 21, No. 11, pp. 1943–1949.

Primary Examiner—Bruce Y. Arnold
Assistant Examiner—James Phan
Attorney, Agent, or Firm—Seymour Levine; Glenn W. Bowen; Mark T. Starr

[57] ABSTRACT

An optical bypass switch receives arbitrarily polarized light from an input optical fiber which is divided into the P and S-polarized light beams by a polarization beamsplitter. These P and S-polarized light beams are focussed to a magneto-optic garnet wherein the plane of polarization is rotated in accordance with a desired switching function and directed to an output optical fiber determined by the polarization rotation state established in the magneto-optic garnet.

14 Claims, 4 Drawing Sheets

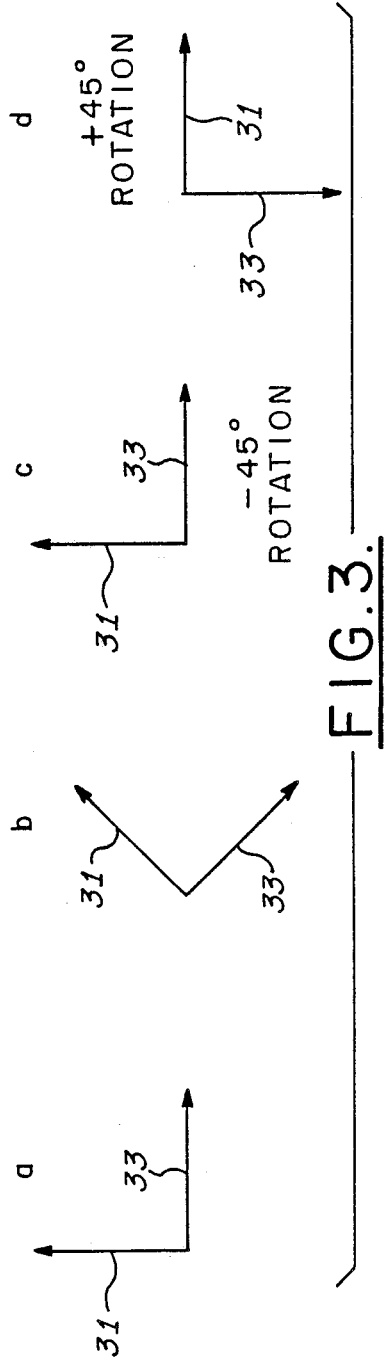
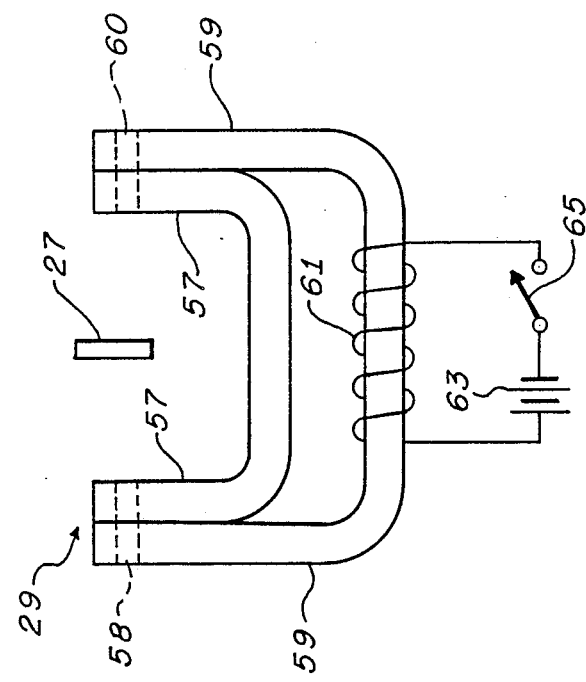
FIG. 3.
FIG. 4.

MAGNETO-OPTIC BYPASS SWITCH

BACKGROUND OF THE INVENTION

1. Field of the Invention

The invention pertains to devices for switching optical signals, and more particularly to magneto-optic switches for switching multimode light signals.

2. Description of the Prior Art

Dual token-ring optical communications networks require multimode otpical bypass switches which operate reliably with low drive power under adverse environmental conditions and which operate in a bypass mode when electrical power is lost. These requirements are difficult to meet with mechanical switches. Switching functions done readily with mechanical switches, however, are difficult to accomplish by non-mechanical means, particularly when fiber optic systems are to be switched. The use of expanded beams and polarizing optics to accomplish the switching in non-mechanical switches results in complex designs that accentuate the problems of achieving low insertion loss and low crosstalk between the terminals. To achieve these goals, the polarization rotator, the principal element in an optical switch, must preserve polarization integrity to a high degree and exhibit low light attenuation properties. It is also desirable to hold the number of optical elements in the switch to a minimum to reduce the complexity and cost.

Magneto-optic garnets which are efficient, high quality, polarization rotators have shown promise as the rotators in optical bypass switches. Garnet based Faraday isolators are well developed and garnet based optical switches for single mode uses have been reported and utilized in an underseas cable system. A garnet based multimode switch with high performance has been demonstrated and reported by Shirasaki et al in a paper entitled "Bistable Magneto-Optic Switch For Multimode Optical Fiber", published in Applied Optics, Volume 21, No. 11, June 1982. These switches utilize Yttrium Iron Garnet (YIG), a composition which exhibits the non-ideal properties, for an optical switch, of low Faraday rotation and high magnetic drive requirements. These properties force the use of YIG as a square waveguide, a configuration not well suited to multimode operation because the two polarization components inherent in the multimode wave have different wave velocities in the garnet. Further, the slab waveguide requires critical alignment with the optical fibers.

A switch of the prior art which utilizes polarization rotation is disclosed in U.S. Pat. No. 4,478,494, issued to Richard A. Soref on Oct. 23, 1984. The polarization rotator in this device is liquid crystal which selectively transmits and reflects polarized light in accordance with the voltage across the crystal. To apply this voltage, electrodes must be positioned on either side of the crystal for its entire length in the switch. Since these electrodes must be metallic and have finite thickness, the light passing through the liquid crystal exhibits excessive loss which affects the over-all switch efficiency.

SUMMARY OF THE INVENTION

An optical bypass switch in accordance with the present invention includes an input polarizing beamsplitter and right angle prism combination which splits an unpolarized collimated input light beam into two orthogonally polarized beams which follow separate but parallel paths through a half wave plate wherein polarizations are rotated through an angle of 45°. These parallel beams are incident to a lens wherefrom they are focussed to a magneto-optic garnet positioned between the poles of a combination permanent electromagnet. Polarization vectors of the light beams passing through the magneto-optic garnet undergo a ±45° rotation depending upon the energizing state of the electromagnet. The light beams emanating from the magneto-optic garnet are incident to a collimating lens wherefrom collimated beams propagate to a second polarization beamsplitter and prism combination which directs the two orthogonally polarized beams to one of the two output ports depending upon the polarization rotation encountered in the magneto-optic garnet.

In a second embodiment of the invention, an arbitrarily polarized input light beam is coupled to a polarization beamsplitter wherefrom two orthogonally polarized beams traverse orthogonal paths, each propagating through a half wave plate encountering a 45° polarization rotation before being focussed by a lens to a magneto-optic garnet mirror combination wherefrom the beams are reflected with a ±45° polarization rotation to the lens from which the beam emerges along a path parallel to the initial path and are coupled to the polarizing beamsplitter. The beams are then directed to one of two output ports depending upon the polarization rotation encountered in the magneto-optic garnet and mirror combination.

In a third embodiment of the invention, an arbitrarily polarized input light beam is coupled to a polarization beamsplitter wherefrom two orthogonally polarized beams traverse parallel paths in a first plane to a lens and focussed therefrom to a magneto-otpic garnet mirror combination to be reflected with 0° or 90° polarization rotations to a second plane to propagate back through the lens to the polarization beamsplitter wherefrom the beams are directed to one of two outputs ports depending upon the polarization rotation encountered in the magneto-optic garnet and mirror combination.

BRIEF DESCRIPTION OF THE DRAWINGS

FIG. 3 is a polarization vector diagram useful for explaining the operation of the invention.

FIG. 4 is a schematic diagram of a magnet assembly useful in the preferred embodiment of FIG. 1.

DESCRIPTION OF THE PREFERRED EMBODIMENTS

Figure 1:
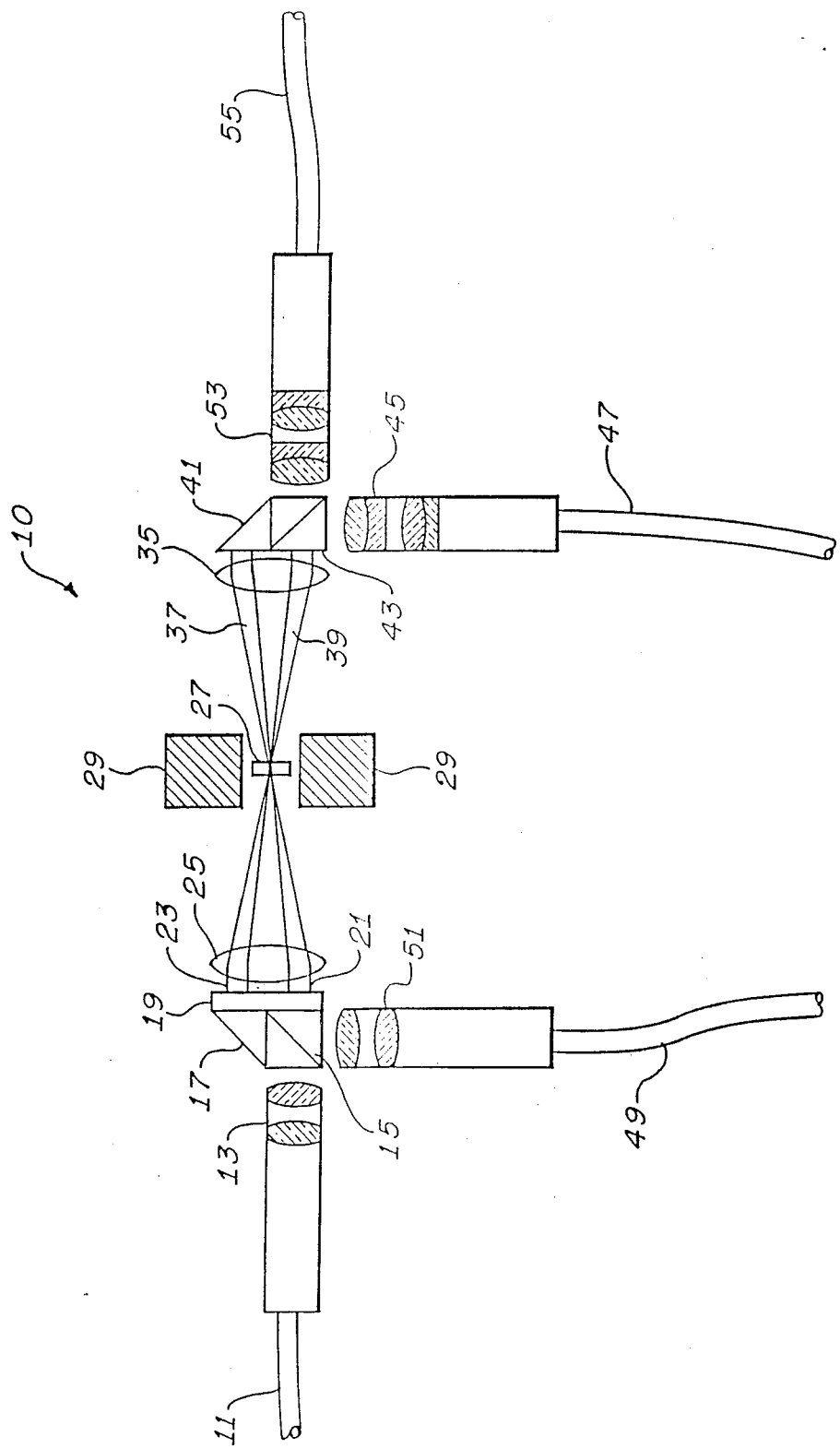
FIG. 1 is a schematic diagram of a preferred embodiment of the invention.

Referring to FIG. 1, arbitrarily polarized light incident to the magneto-optic bypass switch, generally indicated at 10, from an optical fiber 11 is collimated by collimating lens 13 so that a collimated beam impinges upon a polarization beamsplitter 15. The arbitrarily polarized beam is split into two collimated polarized beams at orthogonal polarizations, one which is in the plane of incidence of the beamsplitter (P-component) which passes through the beamsplitter without deflection, and the other perpendicular to the plane of incidence (S-component) which is deflected at a right angle from the incident direction to a prism 17 wherein it is again perpendicularly deflected to be parallel to the P-component. A half wave plate 19 is positioned adjacent the beamsplitter 15 and prism 17 to provide a 45° rotation to the planes of polarization to the P-polarized beam 21 and the S-polarized beam 23 which are coupled therefrom to a focussing lens 25. Light beams emanating from the focussing lens 25 are focussed to a magneto-optic garnet 27 subjected to a magnetic field provided by a permanent-electromagnet combination 29 which, depending upon the magnetic field provided by the magnet assembly 29, provides a ±45° rotation of the planes of polarization. Focussing the beam and rotating the planes of polarization by 45° significantly reduces the size of the magneto-optic garnet so that less costly garnets may be utilized and the light attenuation in traversing the garnet is reduced.

Refer now to FIG. 3 wherein a vector diagram of the polarization states within the switch are illustrated. The beams incident to polarization rotator 19 have a P-polarized polarization component 31 and a S-polarization component 33 in the orthogonal relationship shown a (a). These polarizations are rotated by 45° in the half wave plate 19 as shown at (b). Assume that a −45° rotation of the plane of polarization is accomplished when the electromagnet assembly 29 is energized and that the permanent magnet compound of the magnet assembly 29 provides a magnetic field across the magneto-optic garnet 27 sufficient to establish a +45° rotation when the assembly 29 is not energized. As shown at (c), in FIG. 3, the −45° rotation re-establishes the orientations of the P and S-polarization vectors, while the +45° rotation establishes polarization vectors that are rotated at 90° from the initial polarizations as shown at (d), thus altering the polarization vector 31 from a P-polarized vector to a S-polarized vector and the polarization 33 from a S polarized vector to a P-polarized vector.

Refer again to FIG. 1 and assume that the electromagnet of the magnetic assembly 29 is energized to provide a −45° rotation to the light beams emerging from the magneto-optic garnet 27. The beam emerging from the magneto-optic garnet corresponding to the beam 21 is incident to a collimating lens 35 along a path 37 while the beam corresponding to the beam 23 is incident to the collimating lens 35 via a path 39. The beams along paths 37 and 39 are respecctively P and S-polarized. The P-polarized beam emerging from the collimating lens 35 is incident to a right angle prism 41 and therefrom to a polarization beamsplitter 43 through which it is coupled to a focussing lens 45 to be focussed to an output optical fiber 47. The S-polarized beam along the path 39 is collimated by collimating lens 35 and coupled therefrom to the polarization beamsplitter 43 wherefrom it is deflected to the focussing lens 45 and focussed to propagate in the optical fiber 47.

Still referring to FIG. 1, arbitrarily polarized light propagating along an optical fiber 49 is collimated by a lens 51 and coupled to the polarization beamsplitter 15 wherefrom the P-polarized beam is further coupled to the right angle prism 17 and deflected therefrom to the polarization rotator 19 while the S-polarized beam is deflected by the polarization beamsplitter 15 directly to polarization rotator 19. The P and S-polarized beams emerge from the polarization rotator to respectively traverse the paths 23 and 21 to be focussed by the focussing lens 25 to the magneto-optic garnet 27. With the electromagnet component of the magnet assembly 29 energized, the polarization vectors are re-established to the orientations possessed prior to coupling through the polarization rotator 19 so that an S-polarized wave along path 37 is collimated by the collimating lens 35 deflected from the right angle prism 41 to the polarization beamsplitter 43 and therefrom to a focussing lens 53 to propagate along an output optical fiber 55, while a P-polarized beam propagating along path 39 is collimated by the collimating lens 35 and coupled through the polarization beamsplitter to the focussing lens 53 wherefrom it is focussed to the output optical fiber 55. Consequently, when the electromagnet component of the magnet assembly 29 is energized optical signals propagating along fiber 11 are coupled to fiber 47 and therefrom to circuitry for further processing. These processed signals may then be coupled through fiber 49 and the magneto-optic switch to optical fiber 55.

Still referring to FIG. 1, when the electromagnet component of the magnet assembly 29 is de-energized, the light beam emerging from the half wave plate 19 along the path 21 has the plane of polarization of the P-polarized light from the polarizing beamsplitter 15 rotated by 45°, and the light beam emerging from the half wave plate along the path 23 of the S-polarized light deflected from the polarization beamsplitter 15 and the right angle prism 17 also has the plane of polarization rotated through an angle of 45°. These light beams are each focussed to the magneto-optic garnet 27 wherethrough an additional 45° rotation to each beam is provided so that the S-polarized beam deflected from the right angle prism 15 has been rotated to a P-polarized beam along the path 39 represented by the vector 33 in FIG. 3(d) and the P-polarized beam coupled from the beamsplitter 15 has been rotated to an S-polarized beam along the path 37, represented by the vector 31 in FIG. 3(d). The P and S-polarized beams along the paths 39 and 37, respectively, are collimated by the collimating lens 35 so that a collimated P-polarized beam is coupled through the polarization beamsplitter 43 to be focussed by the focussing lens 53 to propagate along the optical fiber 55 and an S-polarized beam is deflected from the right angle prism 41 and by the polarization beamsplitter 43 to be focussed by the focussing lens 53 to propagate along the optical fiber 55. Thus, when the electromagnet of the magnet assembly 29 is de-energized, light coupled to the optical fiber 11 is coupled through the magneto-optic bypass switch directly to the output optical fiber 55.

A schematic diagram of a possible configuration of the magnetic assembly 29 is shown in FIG. 4. The magneto-optic garnet 27 sits between the poles of a permanent magnet 57 and the poles of an electromagnet 59. Light from the beamsplitter 103 or right angle prism 114 may be directed to the magneto-optic garnet 27 through channels 58 and 60 in the poles of the magnets 57 and 59 so that the magnetic field at the garnet 27 is parallel to the light path thereat. The electromagnet is energized through the coils 61 by a source 63 through a switch 65. When the switch 65 is opened, the entire magnetic field is due to the permanent magnet 57 and when closed, the magnetic field is determined by the combination of the permanent magnet 57 and the electromagnet 59.

It should be recognized that the magneto-optic switch 10 will operate in a manner similar to that described above when the half wave plate which provides 45° polarization rotation bias is removed and the magnet assembly 29 and magneto-optic garnet 27 combination is designed to provide rotations of 0 and 90°. In this configuration, when the magnet assembly 29 and magneto-optic garnet 27 combination is then the 0° rotation state, P-polarized light beam 21 from the beamsplitter 15 is focussed by the focussing lens 25 through the magneto-optic garnet 27 along the path 37, collimated by the collimating lens 35 and deflected by the right angle prism 41 through the polarization beamsplitter 43 to the focussing lens 45 to propagate along the optical fiber 47, while the S-polarized light from the polarization beamsplitter 15 is deflected by the right angle prism 17, focussed by the focussing lens 25 through the magneto-optic garnet 27 to propagate along the path 39, collimated by the collimating lens 35, and deflected by the polarization beamsplitter to the focussing lens 45 to propagate along the optical fiber 47. In this zero polarization rotation mode, the P-polarized component of the light beam from the collimating lens 51 is deflected by the right angle prism 17 and coupled through the focussing lens 25, the magneto-optic garnet 27, the collimating lens 35, the polarization beamsplitter 43 to the focussing lens 53 to propagate along the optical fiber 55 while the S-polarized component of the light beam from the collimating lens 51 is deflected from the polarization beamsplitter to propagate through the focussing lens 25, the magneto-optic garnet 27, and the collimating lens 35 to be incident to the right angle prism 41 and through the polarization beamsplitter 43 to the focussing lens 53 wherefrom it is focussed to propagate along the optical fiber 55. When the magnet assembly 29 and magneto-optic garnet 27 combination is in a 90° poalrization rotation mode, P-polarized light from the beamsplitter 15 is coupled by a path 21, focussing lens 25, magneto-optic garnet 27, path 37, and collimating lens 35 to be incident to the right angle prism 41 as a S-polarized wave that is deflected by the polarization beamsplitter 43 to the focussing lens 53 to propagate along the optical fiber 55. In a similar manner, S-polarized waves incident to the beamsplitter 15 are coupled via the right angle prism 17, path 19, focussing lens 23, the magneto-optic garnet 27, path 39, and collimating lens 35 to be incident to the polarization beamsplitter 43 and coupled therethrough to the focussing lens 53 wherefrom it is focussed to propagate along the optical fiber 55.

Magneto-optic garnets for use in the invention may be grown using a modified garnet liquid phase epitaxy growth technique, the modification being that the substrate is not dipped into the melt, but is instead rotated on the surface of the melt to grow an epitaxial film on only one side. This method of manufacture is fully descirbed in U.S. patent application Ser. No. 06/819,085, filed Jan. 15, 1986 by Jeffrey M. Sittig, Gary L. Nelson, and Mark L. Wilson, assigned to the assignee of the present invention and herein incorporated by reference. This improves the film quantity. Bismuth substituted garnet films with nominal compositions of $Bi_{1.5}Lu_{0.7}Gd_{0.8}Fe_{4.2}Ga_{0.8}O_{12}$ and $Bi_{1.8}Lu_{0.6}Gd_{0.6}Fe_{4.2}Ga_{0.8}O_{12}$ were grown on calcium magnesum zirconum substituted gadolinium gallium garnet (CMZGGG) substrates with this technique. These two garnet compositions provide a combination of high Faraday rotation and low magnetic bias field which were used in experimental models of the invention.

Figure 2:
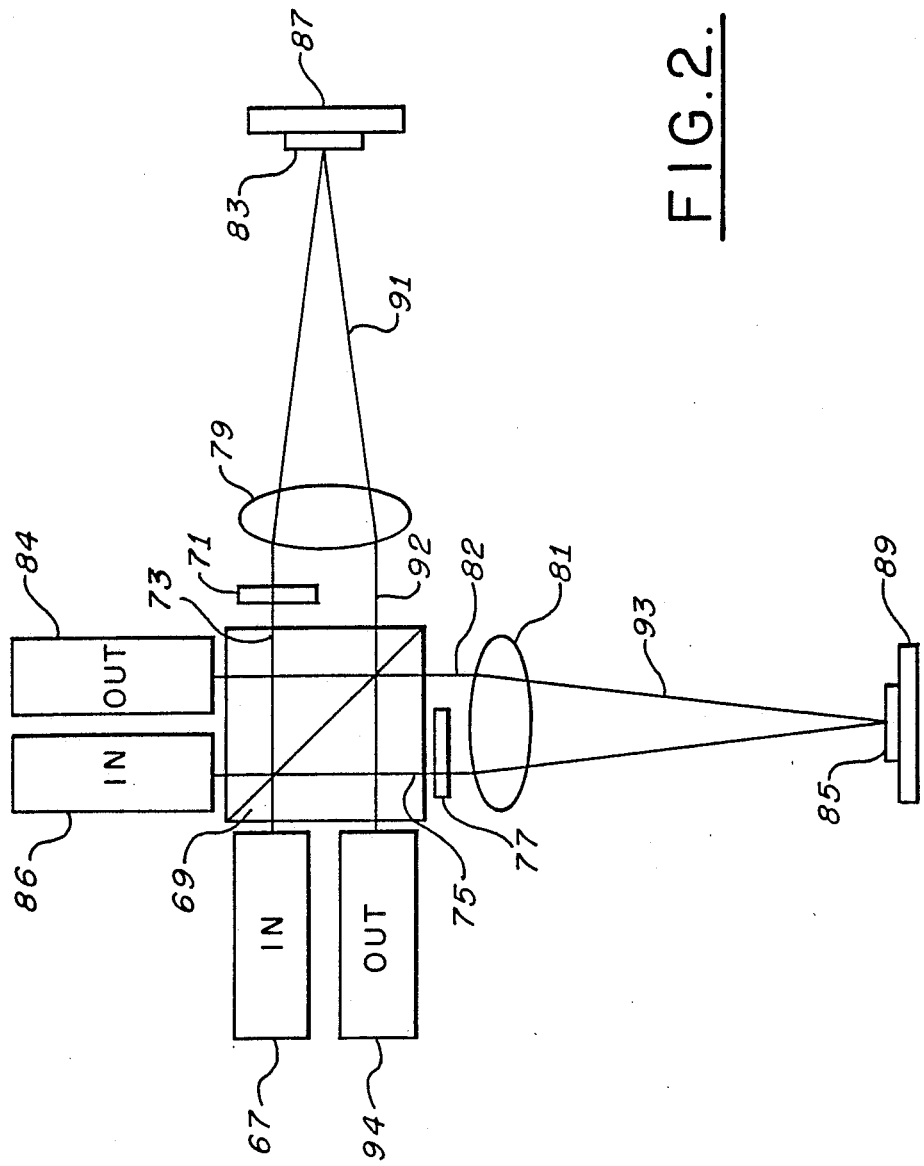
FIG. 2 is a schematic diagram of a second preferred embodiment of the invention.

A compact version of the magneto-optic switch which eliminates the right angle prisms and permits the use of thinner magneto-optic garnets which are easier to grow is illustrated in FIG. 2. Collimated arbitrarily polarized light beam from an input optical fiber in collimated lens assembly 67 is coupled to a polarizing beamsplitter 69 wherefrom P-polarized light is coupled to a half wave plate 71 along a non-deflected path 73, while S-polarized light is deflected along a path 75 to a second half-wave plate 77. The light beams emerging from the half-wave plate 71 and 77, wherethrough the planes of polarization have been rotated through an angle of 45°, are respectively focussed by lenses 79 and 81 to magnet-optic garnets 83 and 85. In one mode of operation, these focussed light beams have their planes of polarization rotated an additional 22.5° in traversing the magneto-optic garnets 83 and 85 and are respectively reflected from mirrors 87 and 89 back through the magneto-optic garnets 83 and 85 to have the planes of polarization rotated an additional 22.5°. The polarization rotations provided by the half-wave plate 71 and the magneto-optic garnet 83 transform the P-polarized beam along path 73 to an S-polarized beam along a path 91, while the polarization rotations provided by the half-wave plate 77 and the magneto-optic garnet 85 transform the S-polarized beam along path 75 to a P-polarized beam along a path 93. The P-polarized beam along the path 93 is collimated by the lens 81 to establish a collimated P-polarized beam along a path 82 which passes through the polarization beamsplitter 69 to an output optical fiber lens assembly 84, while the S-polarized beam along the path 91 is collimated by the lens 79 to provide a collimated S-polarized beam along the path 92 which is deflected by the polarization beamsplitter 69 to the opotical fiber lens assembly 84.

In a second mode of operation, the magneto-optic garnets 83 and 85 are set to provide −22.5° rotations of the polarization planes. In this mode of operation, the P-polarized light along path 73 is transformed back to P-plarized light along path 91 and S-polarized light along the path 75 is transformed back to S-polarized light along the paths 93. Thus, a collimated beam of P-polarized light along path 92 traverses the polarization beamsplitter 69 and is coupled to an output optical fiber lens combination 94 and a collimated beam of S-polarized light along path 82 is deflected by the polarization beamsplitter 69 to the output optical fiber lens combination 94. In a similar manner, optical signals incident to the magneto-optical switch 10 from an input optical fiber lens combination 86 are coupled to the output optical fiber lens combination 94 when the magneto-optic garnets 83 and 85 are set to provide +22.5° of polarization rotation. Optional signals incident from the fiber optic lens combination 86 will be coupled to the output optical fiber lens combination 84 when the magneto-optic garnets 83 and 85 are set to provide −22.5° polarization rotation.

Figure 5A:
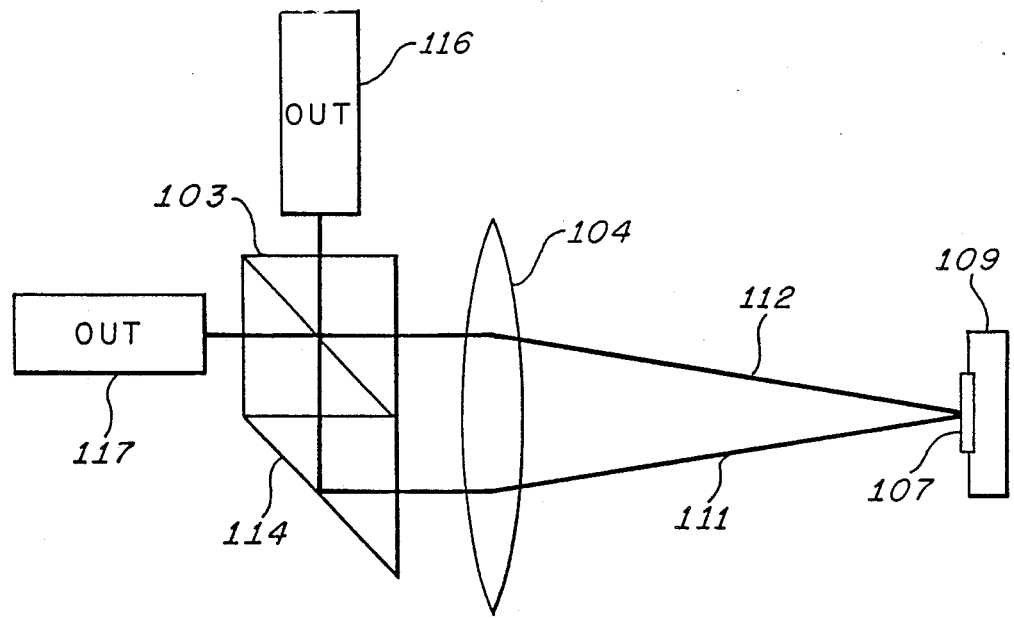
FIGS. 5A and 5B schematically show top and side view of a third preferred embodiment.
Figure 5B:
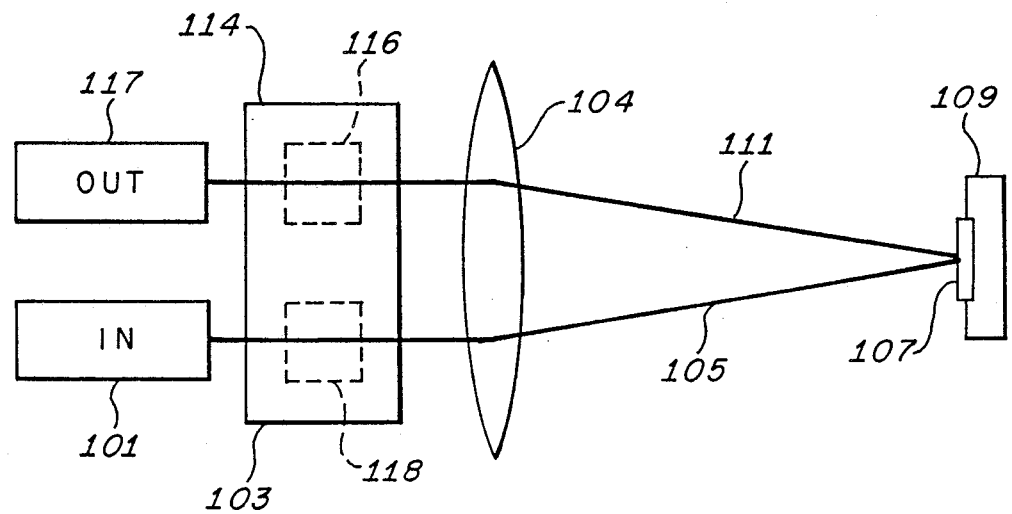

A folded version of the magneto-optic switch 10 of FIG. 1 is shown schematically in FIGS. 5A and 5B which are schematic top and side views respectively, of the folded magneto-optic switch. In operation, arbitrarily polarized collimated light from an input optical fiber lens combination 101 is incident to the lower half of the polarization beamsplitter 103 as shown in the side view of FIG. 5B. P-polarized light from the polarization beamsplitter 103 is focussed by lens 104 and tranverses a path, not shown, but behind the path 105 and below the path 112 in FIG. 5A to be focussed to the magneto-optic garnet 107 wherethrough the beam realizes a +45° polarization rotation and is reflected from a mirror 109 to retraverse the magneto-optic garnet 107 a second time and emerge therefrom as S-polarized light along the path 111 in FIG. 5A. This S-polarized light is collimated by the lens 104 and is deflected by the upper portion of right angle prism 114 to be incident to polarization beamsplitter 103 in the upper plane and deflected therefrom to the output optical fiber lens combination 117. The S-polarized light component of the light from the input optical fiber 101 is deflected from polarization beamsplitter 103 in the lower half of a right angle prism 114 and deflected therefrom to be focussed by the lens 104 to magneto-optic garnet 107 along the path 105. This S-polarized light is reflected from the magneto-optic garnet 107-mirror 109 combination along the path 112 as P-polarized light, which is collimated by the lens 104 and is incident to the upper half of the polarization beamsplitter 103 wherefrom it is coupled to the output optical fiber-lens combination 117.

In this mode of operation, wherein the magneto-optic garnet 107-mirror 109 combination imparts a 90° polarization rotation, collimated unpolarized light from an input optical fiber-lens combination 118 positioned below the output optical fiber lens combination 116, has P-polarized light deflected from the lower portion of the right angle prism 114 to be focussed by the lens 104 and propagate along the path 105 to the magneto-optic garnet 107-mirror 109 combination and reflected therefrom as S-polarized light along the path 112. This S-polarized light is collimated by the lens 104 and is incident to the polarization beamsplitter 103 from which it is deflected to the output optical fiber-lens combination 116. The S-polarized light component of the fiber-lens combination 118 deflected from the lower section of the polarization beamsplitter 103 is focussed by the lens 104 to traverse a path not shown but below the path 112 and behind the path 105 to be incident to the magneto-optic garnet 107-mirror 109 combination and emerge therefrom is P-polarized light along the path 111. This P-polarized light is collimated by the lends 104 and is deflected by the upper portion of the right hand prism 114 through the upper portion of polarization beamsplitter 103 to the output optical fiber-lens combination 116.

When the magneto-optic garnet 107-mirror 109 combination is set to provide 0° of polarization rotation, the P-polarized light resulting from the arbitrarily polarized beam from the input fiber-lens combination 101 incident to the lower section of the polarization beamsplitter 103 traverses the path that is not shown to be reflected from the magneto-optic garnet 107-mirror 109 combination to propagate along the path 111 as P-polarized light which is collimated by the lens 104 and reflected by the right angle prism 114 through the polarization beamsplitter 103 to the output optical fiber 116. The S-polarized light from the polarization beamsplitter 103 is deflected by the right angle prism 114 and focussed by the lens 104 to propagate along the path 105 to the magneto-optic garnet 107-mirror combination and reflected therefrom along the paths 112 as S-polarized light that is collimated by the lens 104 and deflected by polarization beamsplitter 103 and therefrom to the output optical fiber-lens combination 116.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. An apparatus having first, second, third and fourth ports for coupling arbitrarily polarized light beams, resolvable into first and second linear polarizations, between port pairs in accordance with first and second modes of operation, the first and second ports paired and the third and fourth ports paired in the first mode of operation, the first and fourth ports paired and second and third ports paired in the second mode of operation comprising:

beamsplitting means coupled to said first, second, third and fourth ports for converting said arbitrarily polarized light beams into first and second light beams polarized at first and second polarizations, respectively, and directing said first and second light beams along predetermined paths between said port pairs;

polarization rotation means for rotating said polarizations of said first and second light beams including controllable polarization rotation means for providing selectable first and second polarization rotations to said polarizations of said first and second light beams, said first polarization establishing said first mode of operation and said second polarization establishing said second mode of operation; and lens means positioned along said predetermined paths for focussing light beams to said controllable polarization rotation means and for collimating light beams emanating from said controllable polarization rotation means, said controllable polarization rotation means incuding magneto-optic means having first and second polarization rotation reflection means for reflecting light beams incident thereto such that polarizations of light beams reflected therefrom are rotated through an angle relative to polarizations of light beams incident thereto in accordance with selected magnetic fields, and magnetic means for applying said selected magnetic fields to said magneto-optic means; and said lens means including a first lens positioned between said beamsplitting means and said first polarization rotation reflection means such that said first polarization rotation reflection means is located in a focal plane of said first lens, and a second lens positioned between said beamsplitting means and said second polarizatin rotation reflection means such that said seconde polarization rotation reflectin means is located in a focal plane of said second lens.

2. The apparatus of claim 1 wherein said magnetic means includes a permanent magnet and an electromagent.

3. The apparstus of claim 1 wherein said polarization rotation reflection means includes a magneto-optic garnet having a nominal composition $Bi_{1.5}$ $Lu_{0.7}$ $Gd_{0.8}$ $Fe_{4.2}$ $Ga0.8$ $O_{12}$.

4. The apparatus of claim 1 wherein said polarization rotation reflection means includes a magneto-optic garnet having a nominal composition $Bi_{1.8}$ $Lu0.6$ $Gd0.6$ $Fe4.2$ $Ga0.8$ $O_{12}$.

5. The apparatus of claim 1 wherein:

said beamsplitting means includes a first polarization beamsplitter coupled to said first the third ports and a second polarization beamsplitter coupled to said second and fourth ports;

said magneto-optic means is positioned between said first and second polarization beamsplitters; and said lens means includes a first lens positioned between said first polarization beamsplitter and said magneto-optic means and a second lens positioned between said second polarization beamsplitter and said magneto-optic means, said first and second lenses located such that said magneto-optic means is in a focal plane of each of said first and second lenses.

6. The apparatus of claim 5 wherein said polarization rotation means further includes a polarization rotator positioned between said first polarization beamsplitter and said first lens, said polarization rotator providing a predetemined polarization rotation to polarizations of light beams propagating therethrough.

7. The apparatus of claim 6 wherein said polarization rotator is a half-wave plate.

8. The apparatus of claim 5 wherein said beamsplitting means further includes a first prism for coupling light beams between said first polarization beamsplitter and said first lens and a second prism for coupling light beams between said second polarization beamsplitter and said second lens.

9. The apparatus of claim 8 wherein said first and second prisms are right angle prisms.

10. The apparatus of claim 1 wherein said polarization rotation means further includes a first polarization rotator positioned between said beamsplitting means and said first lens in a beam path incident to said first polarization rotation reflection means and a second polarization rotator positioned between said beamsplitting means and said second lens, said first and second polarization rotator means providing a predetermined polarization rotation to polarizations of light beams propagating therethrough.

11. The apparatus of claim 10 wherein said first and second polarization rotators are half-wave plates.

12. The apparatus of claim 1 wherein said first and second polarization reflector means each comprise a magneto-optic garnet having a first surface adjacent said lens means and a second surface, opposite said first surface, coupled to a mirror.

13. An apparatus having first, second, third and fourth ports for coupling arbitrarily polarized light beams, resolvable into first and second linear polarizations, between port pairs in accordance with first and second modes of operation, the first and second ports paired and the third and fourth ports paired in the first mode of operation, the first and fourth ports paired and second and third ports paired in the second mode of operation comprising:

beamsplitting means coupled to said first, second, third and fourth ports for converting said arbitrarily polarized light beams into first and second light beams polarized at first and second polarizations, respectively, and directing said first and second light beams along predetermined paths between said port pairs;

polarization rotation means for rotating said polarizations of said first and second light beams including controllable polarization rotation means for providing selectable first and second polarization rotations to said polarizations of said first and second light beams, said first polarization establishing said first mode of operation and said second polarization establishing said second mode of operation, said controllable polarization rotation means including polarization rotation reflection means for reflecting light beams incident thereto such that polarization of light beams reflected therefrom are rotated through an angle relative to polarizations of light beams incident thereto in accordance with selected magnetic fields, said controllable polarization rotation means further including means for applying said selectable magnetic fields; and a lens positioned between said beamsplitting means and said polarization rotation reflection means such that said polarization rotation reflection means is in a focal plane of said lens.

14. The apparatus of claim 13 wherein said beamsplitting means comprises:

a polarization beamsplitter having a first surface adjacent said first and fourth ports and a second surface, having a common edge with said first surface, adjacent said second and third ports; and a right angle prism adjacent a third surface of said polarization beamsplitter opposite said second surface.

* * * * *

UNITED STATES PATENT AND TRADEMARK OFFICE
CERTIFICATE OF CORRECTION

PATENT NO. : 4,969,720

DATED : November 13, 1990

INVENTOR(S) : Stanley J. Lins, David L. Fleming

It is certified that error appears in the above-identified patent and that said Letters Patent is hereby corrected as shown below:

Column 3, line 25, "compound" should be -- component -- .

Signed and Sealed this

Eighteenth Day of February, 1992

*Attest:*

HARRY F. MANBECK, JR.

*Attesting Officer*      *Commissioner of Patents and Trademarks*